United States Patent
Agehama

(10) Patent No.: US 7,420,707 B2
(45) Date of Patent: Sep. 2, 2008

(54) PRINTING SPECIFICATION METHOD AND PRINTING SPECIFICATION DEVICE

(75) Inventor: Ryo Agehama, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 805 days.

(21) Appl. No.: 11/043,271

(22) Filed: Jan. 27, 2005

(65) Prior Publication Data

US 2005/0206925 A1 Sep. 22, 2005

(30) Foreign Application Priority Data

Mar. 16, 2004 (JP) ............................. 2004-074727

(51) Int. Cl.
*B41J 1/00* (2006.01)
*G06F 15/00* (2006.01)

(52) U.S. Cl. ..................... 358/1.9; 358/518; 358/523; 358/524

(58) Field of Classification Search ................. 358/1.9, 358/456, 457, 466, 504, 518, 520, 521, 523, 358/524, 534–536; 382/162, 167, 270
See application file for complete search history.

(56) References Cited

U.S. PATENT DOCUMENTS

| | | | | |
|---|---|---|---|---|
| 5,222,154 A | * | 6/1993 | Graham et al. | 382/162 |
| 6,226,103 B1 | * | 5/2001 | Klassen et al. | 358/1.9 |
| 6,456,395 B1 | * | 9/2002 | Ringness | 358/1.9 |
| 2002/0126328 A1 | * | 9/2002 | Lehmeier et al. | 358/518 |
| 2003/0095271 A1 | * | 5/2003 | Falk | 358/1.9 |
| 2003/0231185 A1 | * | 12/2003 | Kupersmit | 345/589 |
| 2004/0080765 A1 | * | 4/2004 | Nishide et al. | 358/1.9 |
| 2005/0231576 A1 | * | 10/2005 | Lee et al. | 347/100 |
| 2006/0098233 A1 | * | 5/2006 | Jodra et al. | 358/3.26 |
| 2006/0232804 A1 | * | 10/2006 | Furukawa | 358/1.9 |
| 2008/0016040 A1 | * | 1/2008 | Jones et al. | 707/3 |
| 2008/0111998 A1 | * | 5/2008 | Edge | 358/1.9 |

FOREIGN PATENT DOCUMENTS

| JP | A-2000-062253 | 2/2000 |
|---|---|---|
| JP | A-2003-348366 | 12/2003 |

* cited by examiner

*Primary Examiner*—Kimberly A Williams
(74) *Attorney, Agent, or Firm*—Oliff & Berridge, PLC

(57) ABSTRACT

A printing specification method and printing specification device for specifying a spot color, which differs from process colors, as a substitution color, when setting the substitution color for a color plate of one of the process colors and performing printing processing. The printing specification method includes extracting spot colors from a spot color database, displaying a list of names of the extracted spot colors, and specifying a spot color corresponding to a name that has been selected from the list as the substitution color. The spot color database is based on color information which includes characteristic values, which specify the spot colors, and spot color names. The extraction is performed on the basis of a characteristic value which sets a reference point and of a tolerance range of this characteristic value.

10 Claims, 7 Drawing Sheets

PRINTING SPECIFICATION METHOD AND PRINTING SPECIFICATION DEVICE

CROSS-REFERENCE TO RELATED APPLICATION

This application claims priority under 35 USC 119 from Japanese Patent Application No. 2004-074727, the disclosure of which is incorporated by reference herein.

BACKGROUND OF THE INVENTION

1. Field of the Invention

The present invention relates to a printing specification device which is capable of printing simulations which employ spot colors, which are colors that differ from process colors, and more particularly relates to a printing specification method and printing specification device for times of performing printing simulations that employ spot colors.

2. Description of the Related Art

Desktop publishing (DTP) creates a page layout by implementation of image creation, processing, editing, etc. on a processing device such as a personal computer, a workstation or the like. On the basis of this page layout, a film for exposure of a printing plate is created (CEPS), the printing plate is directly written therefrom, and a plate for production printing is created (CTP: Computer-To-Plate).

When proofreading or the like is to be carried out before actual production printing with a printing plate, WYSIWYG functions or the like may be utilized to print out a page layout that is displayed on a monitor from a printout device, such as a page printer or the like (comprehensive layout output).

In usual color printing, the four colors cyan, magenta, yellow and black are employed (i.e., process colors). However, printing is sometimes, depending on requirements, implemented using ink of a color which differs from the process colors (below referred to as a spot color). In recent years, in order to reduce printing costs, two-color printing or the like is sometimes implemented. At such times, particular effects may be obtained by using one of the process colors and a spot color, or two spot colors.

When a two-color printing simulation is performed in order to obtain a color comparison printout with a spot color, if it is only possible to obtain a printout with process colors, it will be difficult to ascertain how the actual printed matter will appear.

Accordingly, a process has been proposed which implements a spot color printing simulation by: actually using printing plates to perform printing of a color chart with spot color inks that are expected to be used in two-color printing; creating a spot color profile (a CMYK-L*a*b* lookup table) by measurements of this color chart; and utilizing this spot color profile with a printer profile (an L*a*b*-C'M'Y'K' lookup table) to implement CMYK-C'M'Y'K' conversions with color management functions.

Further, a color comprehensive layout output method has been proposed which replaces each color of a document created using, for example, any two colors of C, M, Y and K with the color of a desired ink (a spot color).

However, there are numerous ink makers, each of whom produces hundreds or thousands of spot colors. Thus, when a spot color is being assigned for performing a printing simulation, it is necessary to input text of a maker name, a spot color name and so forth.

Consequently, if there is an input error such as a spelling mistake or the like, it will not be possible to execute the printing simulation with the desired color. Moreover, there is a problem in that, in order to input text of a spot color name, it is necessary to know the hue and name of a spot color beforehand.

Furthermore, if expected results are not obtained when a previously known spot color is used, it is necessary to search for a similar spot color, which is not a simple task in practice.

There is also a method in which a spot color name is selected from a list of spot colors which have been specified beforehand. However, because such lists are displayed in a different name order for each maker, it is not possible to distinctly judge between the hues. Furthermore, because there are separate lists for each ink maker, selection of a desired spot color from among the different makers is a difficult task.

SUMMARY OF THE INVENTION

The present invention has been made in view of the above circumstances and provides a printing specification method and a printing specification device.

A first aspect of the present invention is a printing specification method for specifying a spot color, which differs from process colors, as a substitution color when setting the substitution color for a color plate of one of the process colors and performing printing processing, the method including the steps of: on the basis of a characteristic value which sets a reference point and of a tolerance range of this characteristic value, extracting corresponding spot colors from a database of spot colors, the database being based on color information including characteristic values, which specify the spot colors, and spot color names; displaying a list of names of the extracted spot colors; and specifying a spot color corresponding to a name selected from the list as the substitution color.

A second aspect of the present invention is a printing specification device that specifies a spot color, which differs from process colors, as a substitution color when setting the substitution color for a color plate of at least one of the process colors and performing printing processing. The device includes an spot color extraction component which, on the basis of a characteristic value which sets a reference point and of a tolerance range of this characteristic value, extracts corresponding spot colors from a database of spot colors, the database being based on color information including characteristic values, which specify the spot colors, and spot color names; a display which displays a list of names of the extracted spot colors; and a spot color specification component which specifies a spot color corresponding to a name selected from the list as the substitution color.

BRIEF DESCRIPTION OF THE DRAWINGS

Embodiments of the present invention will be described in detail based on the following figures, wherein.

DETAILED DESCRIPTION OF THE INVENTION

Figure 1:
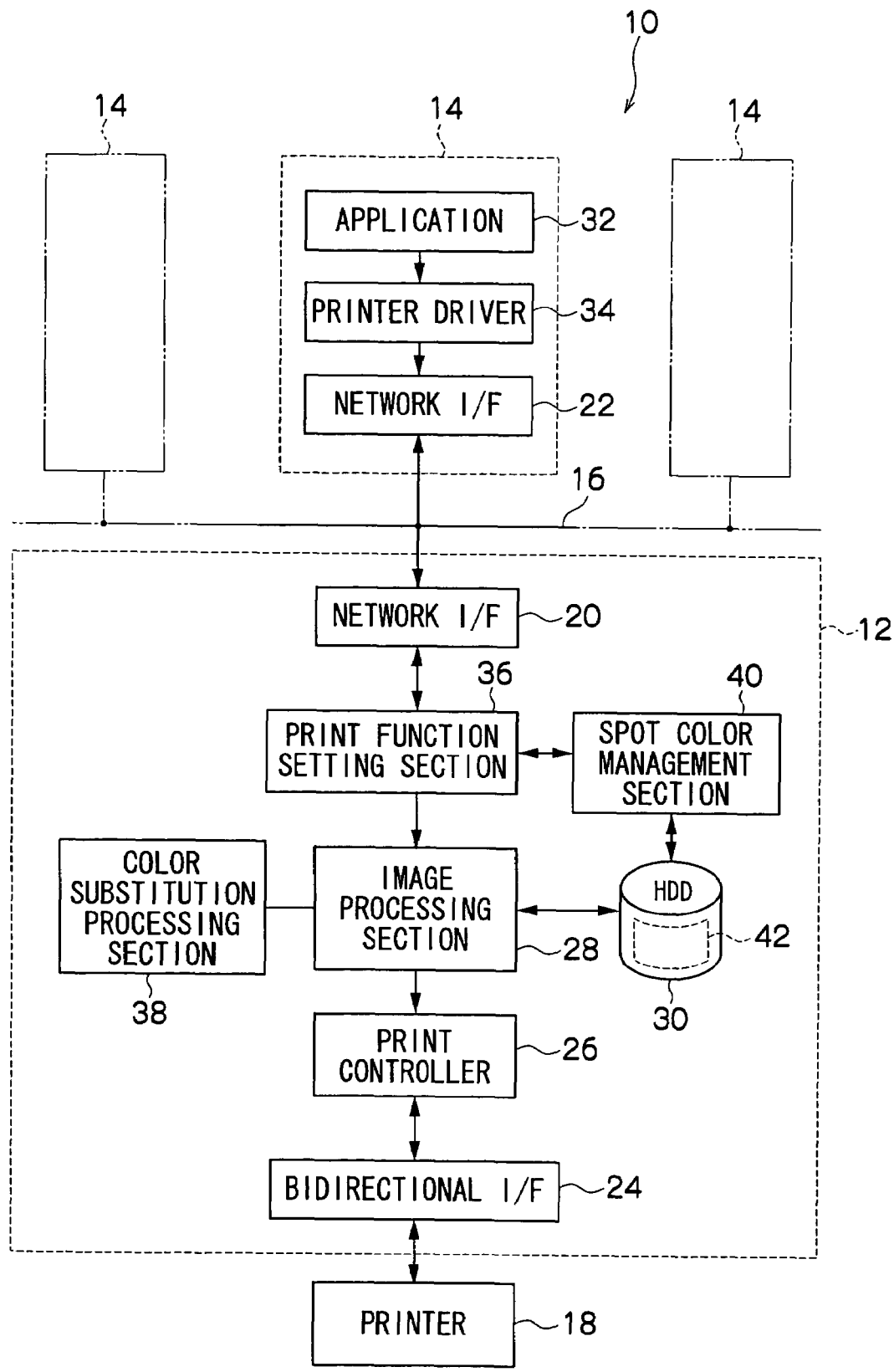
FIG. 1 is a schematic structural diagram of a network which is employed in an embodiment of the present invention, and of a print server and a client terminal provided at the network.

Herebelow, an embodiment of the present invention will be described with reference to the drawings. FIG. 1 shows general structure of a network 10 at which the present embodiment is applied. In this network 10, a print server 12 and a plurality of client terminals 14 are network-connected by a communications circuit 16. The print server 12 is provided to serve as an image processing device, and the client terminals 14 are provided to serve as image processing terminals.

A printer 18, serving as a printing output device, is also connected to the print server 12. When the print server 12 receives a print job outputted from the client terminals 14, the print server 12 uses the printer 18 to perform a printout in accordance with the print job.

An image processing device which is employed as the print server will be described herebelow. However, the image processing device of the present invention is not limited thus, and could be a device which is provided to perform image processing at any of various intermediate servers, such as a file server or the like which is network-connected with the client terminals 14. Further, not necessarily the printer 18, but a plate-setter, which directly exposes photosensitive planographic printing plates in accordance with image data in order to prepare the printing plates for printing, an exposure device which exposes original films, which are utilized for burning (exposing) images onto photosensitive planographic printing plates, or the like may be connected.

Network interfaces (network I/F) 20 and 22 are provided at the print server 12 and the client terminals 14. The print server 12 and the client terminals 14 are connected to the communications circuit 16 through these network interfaces 20 and 22. The print server 12 is further provided with a bidirectional interface (bidirectional I/F) 24. The print server 12 is connected to the printer 18 through this bidirectional I/F 24.

Herein, a plurality of the printer 18 may be connected to the print server 12, and a plurality, or even a plurality of types, of the bidirectional I/F 24 may be employed. Furthermore, a freely selected network protocol may be employed for network connections of the plurality of client terminals 14 and the print server 12.

The print server 12 described above may be structured by adding a PCI board equipped with predetermined functions to a personal computer (PC) or suchlike. Further, the print server 12 may be an apparatus which is provided with an input device such as a keyboard, a mouse or the like and a display device such as a CRT display, an LCD display or the like, and which is provided with WYSIWYG functions for processing images displayed at the display device and printing out the displayed images.

A print controller 26, an image processing section 28 and an HDD 30 are provided at the print server 12. The print controller 26 controls the printer 18 and the print server 12 itself, and the HDD 30 serves as a storage component which stores various kinds of data. The image processing section 28 carries out RIP processing to create raster data on the basis of job data, such as image data, drawing instructions and the like which are inputted in the form of print jobs from the client terminals 14.

The print server 12 stores the inputted print jobs in a processing queue. The print jobs stored in the processing queue are read out sequentially and image processing (RIP processing) is executed. The image-processed data which is to be outputted to the printer 18 (i.e., raster data) is stored in a printing queue, and is sequentially outputted from the printing queue to the printer 18. Further, the print server 12 has an ordinary structure in which jobs for which printing processing is not instructed or for which printing processing cannot be executed are stored and retained in a holding queue. The print server 12 as described hereabove can employ various conventionally known structures, and is not described in detail for the present embodiment.

The client terminal 14 is provided with a DTP application (below referred to as the "application 32"). The client terminal 14 uses this application 32 to perform image processing and the like, including creation, processing, editing and so forth of images, texts, etc. The application 32 enables the client terminal 14 to create image data and/or drawing commands (below referred to as image data) for printing of page layouts and the like with printing plates.

A printer driver (driver software) 34 is also provided at the client terminal 14. Through this printer driver 34, the client terminal 14 can send jobs (print jobs) including image data, such as page layouts and the like prepared by the application 32 or the like, and various processing instructions to the print server 12. At this time, it is possible to specify various printing functions with the printer driver 34.

Further, because this printer driver 34 is employed at the client terminal 14, it is possible to apply various settings and the like to the print server 12.

A print function setting section 36 is provided at the print server 12. When the print server 12 receives a job, such as a print job or the like, settings of various printing functions which are designated by the print job are implemented. Herein, setting of conventionally known printing functions at the print server 12 is possible. The print function setting section 36 assesses the printing functions designated by the print job, and sets execution of each printing function at the print controller 26 and the image processing section 28. However, this is not described in detail for the present embodiment.

A color substitution processing section 38 is also provided at the print server 12. When substitution of a designated color is specified for a drawing object with a color assigned, such as an image, a text or the like, this color substitution processing section 38 implements a color substitution in accordance with the specification.

L*a*b* values which are specified beforehand for each of spot colors, separately from the process colors cyan (C), magenta (M), yellow (Y) and black (K), and a table for converting the L*a*b* values to CMYK values (a profile) are stored in the HDD 30 which is provided at the print server 12 to serve as the storage component.

When a color substitution of a spot color for the color plate of any of the process colors is instructed, the color substitution processing section 38 refers to the L*a*b* values of the corresponding spot color and the look-up table (LUT) for converting these L*a*b* values to CMYK values, which are stored in the HDD 30, implements an update (a substitution) of color information, and generates new color information. That is, the new color information (CMYK values) is generated by combining the CMYK values of the spot color designated by the color substitution with the CMYK values of the color plates other than the color plate designated by the color substitution.

Accordingly, it is possible when, for example, creating image data and/or text data for two-color printing using two arbitrary colors selected from the process colors, to print out with a spot color(s) differing from the process colors as one or both of those two colors.

That is, simulations of cases in which printing processing will be performed using inks which differ from the process colors at the time of printing out with printing plates are possible.

For this color substitution processing, a CMYK printout region and a CMYK color correction region are constituted in, for example, a memory provided at the image processing section 28. When image processing is to be carried out on an image in a print job (an image object), CMYK values of the spot color (the CMYK values that have been converted from the L*a*b* values) are stored in the CMYK printout region.

Further, CMYK values of the process colors that are to be used for this image object are stored in the CMYK color correction region. After color correction has been performed on the CMYK values stored in the CMYK color correction region, new color information for this drawing object is generated by combining the corrected CMYK values with the CMYK values stored in the CMYK printout region, and this new color information is outputted.

The provision of the color substitution processing section 38 as described above enables N-color printing simulations that utilize spot colors at the print server 12. Herein, arbitrary structures can be employed for the color substitution processing, and are not described in detail for the present embodiment.

Settings of N-color printing simulations, which are provided as a function of the print server 12, can be made from the printer driver 34 provided at the client terminal 14. A user interface (UI) is specified for making these settings.

Consequently, settings of N-color printing simulations, such as two-color printing simulations and the like, can be made from the client terminal 14 with ease by using the user interface.

A spot color management section 40 is constituted at the print server 12, and a spot color database 42 is stored at the HDD 30. The database 42 is administered by the spot color management section 40. Numerous spot color names are registered in the database 42, and a manufacturing maker (i.e., the maker's name) and L*a*b* values are stored with each spot color name in the database 42.

Hence, when a two-color printing simulation in which a spot color is assigned is specified at the print server 12, the L*a*b* values of the assigned spot color name are read out, and it is possible to perform color substitution processing therewith.

Figure 2:
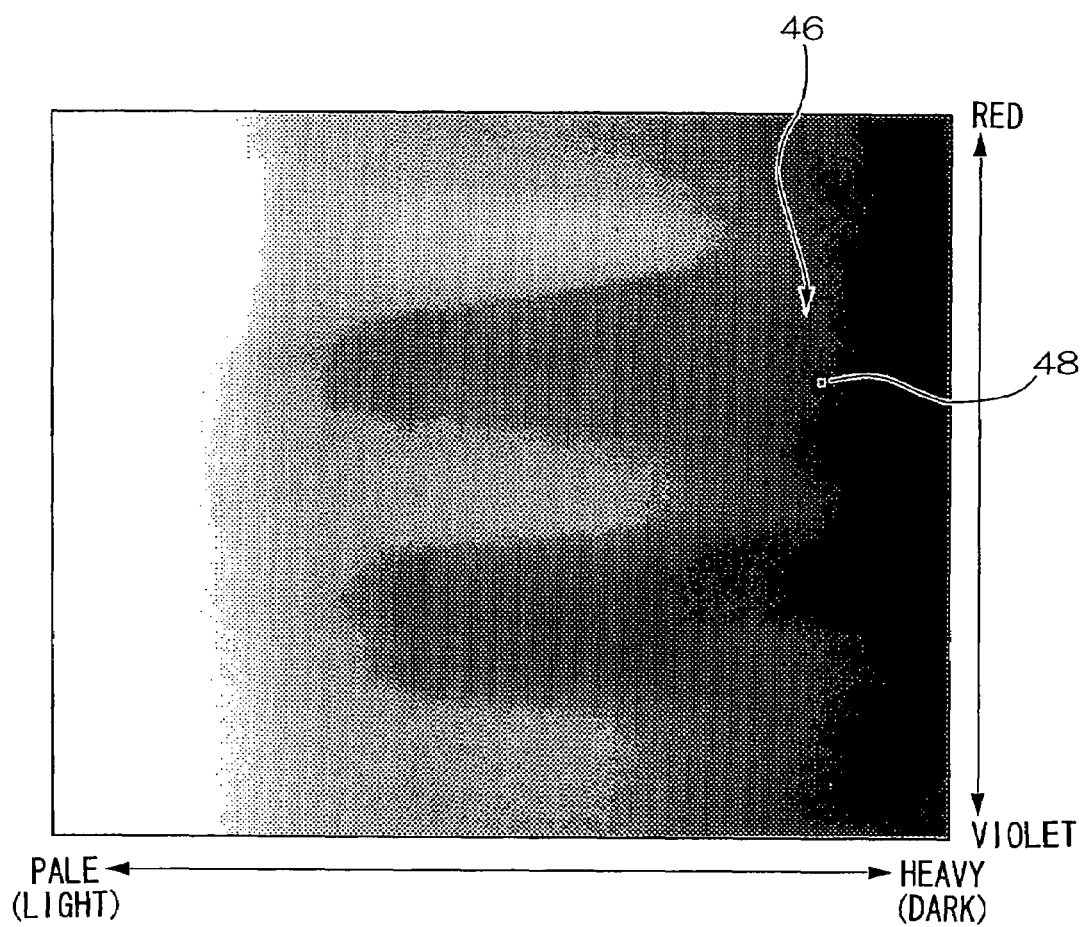
FIG. 2 is a schematic diagram showing an example of a color palette.

Meanwhile, at the client terminal 14, when the printer driver 34 is used to perform a color substitution with a spot color, it is possible to display a color palette. FIG. 2 shows an example of a color palette 46. This color palette 46 contains information corresponding to L*a*b* values, which information corresponds to L*a*b* values at each position of the color palette 46 that can be designated. Note that the color palette 46 illustrates an example, and structures of color palettes of the present invention are not limited thus. A color palette of the present invention can employ an arbitrary structure as long as the color palette includes display colors and color information corresponding to the display colors.

Thus, given L*a*b* values of a color, the client terminal 14 can find information corresponding to L*a*b* values of a color of the color palette 46 that is closest to that color, and display the color found on the color palette 46.

At the printer driver 34 provided at the client terminal 14, L*a*b* values of a color designated by, for example, a pointer 48 on the color palette 46, tolerance ranges of the L* value, the a* value and the b* value, and manufacturing makers are assigned, and the printer driver 34 requests a list of spot colors with L*a*b* values within these tolerance ranges.

When the list of spot colors is requested by the client terminal 14, the spot color management section 40 of the print server 12 extracts corresponding spot colors from the database 42 and sends the spot colors to the client terminal 14.

Thus, when a color assigned in the color palette 46 is changed, the client terminal 14 can display the relevant color and a list of spot colors that are similar to that color.

Further, by selection of a spot color name from the displayed list of spot colors, the client terminal 14 can specify a printing simulation which employs the spot color with the selected spot color name.

At the print server 12 described above, image data and/or drawing instructions, for which processes such as creation, processing, editing, etc. have been carried out with the application 32, are received from the client terminal 14 in the form of a print job. When this print job is received, the print server 12 executes image processing and printing processing in accordance with the received print job.

When a print job is received by the print server 12, reading and setting of printing functions is performed by the print function setting section 36. At the image processing section 28, image processing is carried out on the image data of the print job in accordance with the specified printing functions and RIP processing is performed to generate raster data.

The raster data created by the image processing section 28 is outputted to the printer 18 with a predetermined timing, and printing output based on the print job is implemented by the printer 18.

Here, it is possible to set N-color printing simulation as a printing function at the print server 12. Further, when an N-color printing simulation is to be performed, assignment of a spot color is possible. Thus, N-color printing simulations employing spot colors are enabled.

Now, a color substitution with a spot color and an N-color printing simulation will be described with reference to FIGS. 3A to 6B.

When an N-color printing simulation is to be performed at the print server 12, a user interface (UI) is used at the client terminal 14 for specifying the color plates to be employed. For example, when there is an image with a C plate, an M plate, a Y plate and a K plate, it is possible to specify the use of those color plates and, as necessary, to assign process colors and/or spot colors as colors for when these color plates are printed.

Figure 3A:
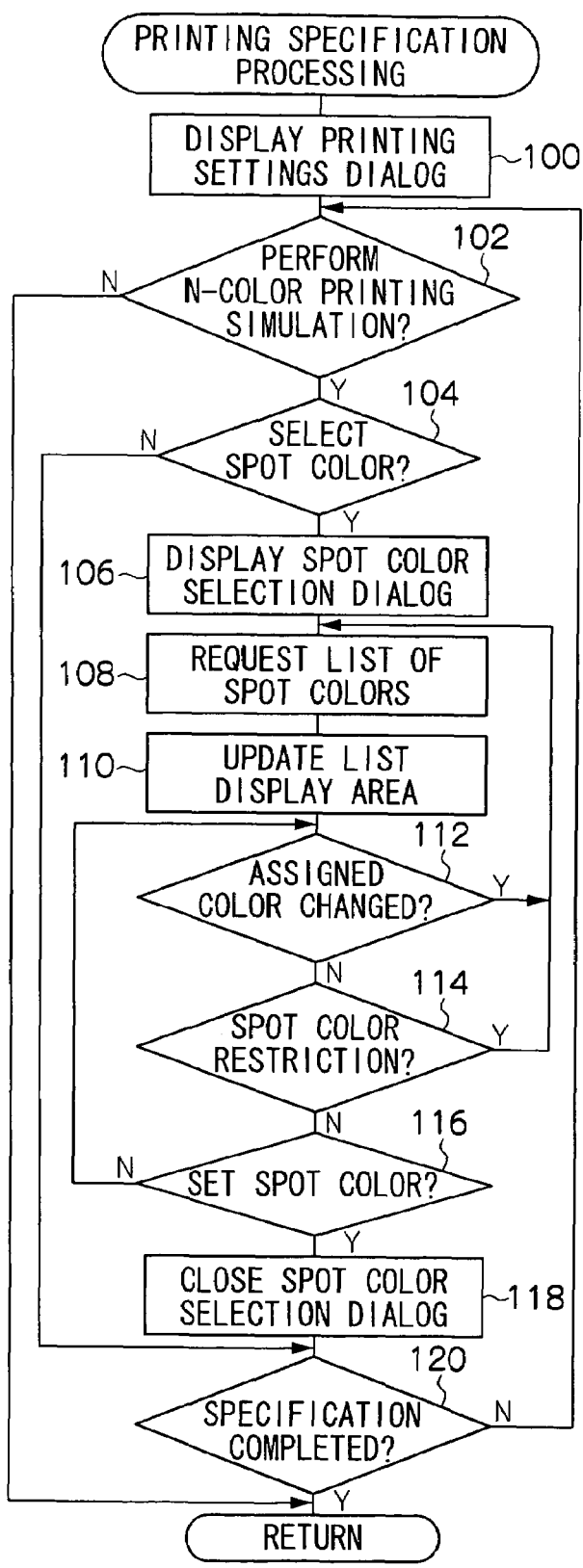
FIG. 3A is a flowchart showing an example of spot color selection at the client terminal.

FIG. 3A shows an outline of printing specification at the client terminal 14 when an N-color printing simulation is to be performed. This flowchart is executed when the N-color printing simulation is being specified. In step 100, a printing settings dialog employed in setting the N-color printing simulation is displayed.

Figure 4A:
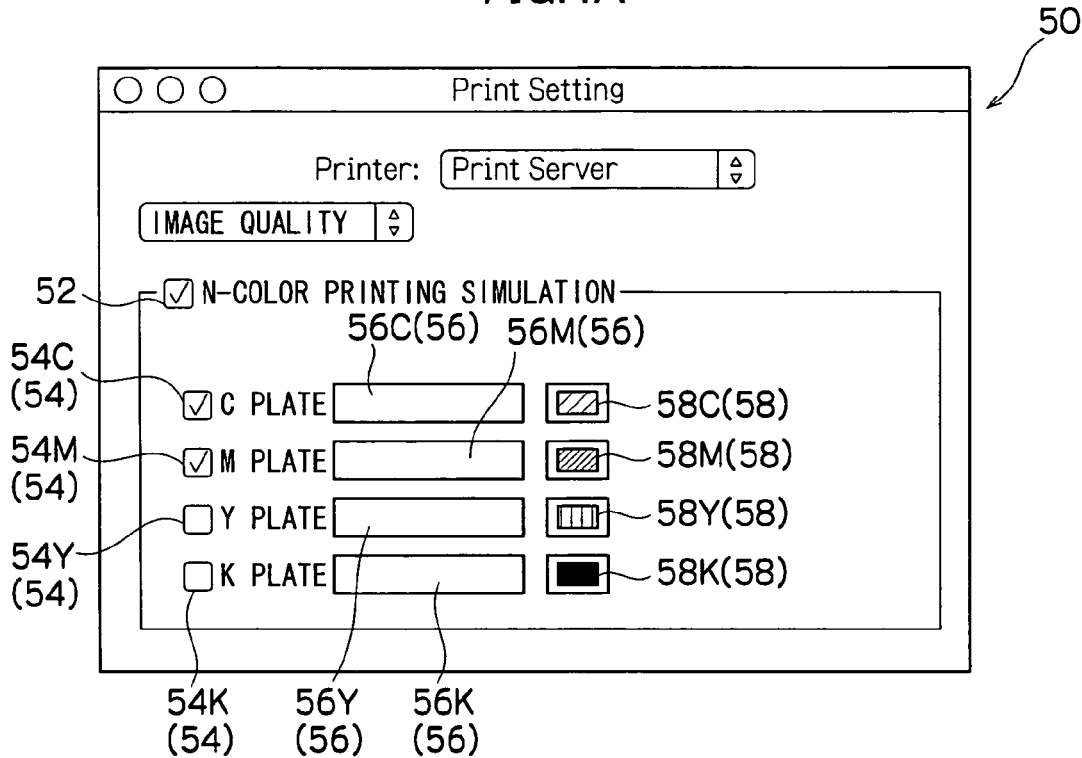
FIG. 4A is a schematic view showing a printing settings dialog which serves as an example of a user interface, and shows a display with default values.
Figure 4B:
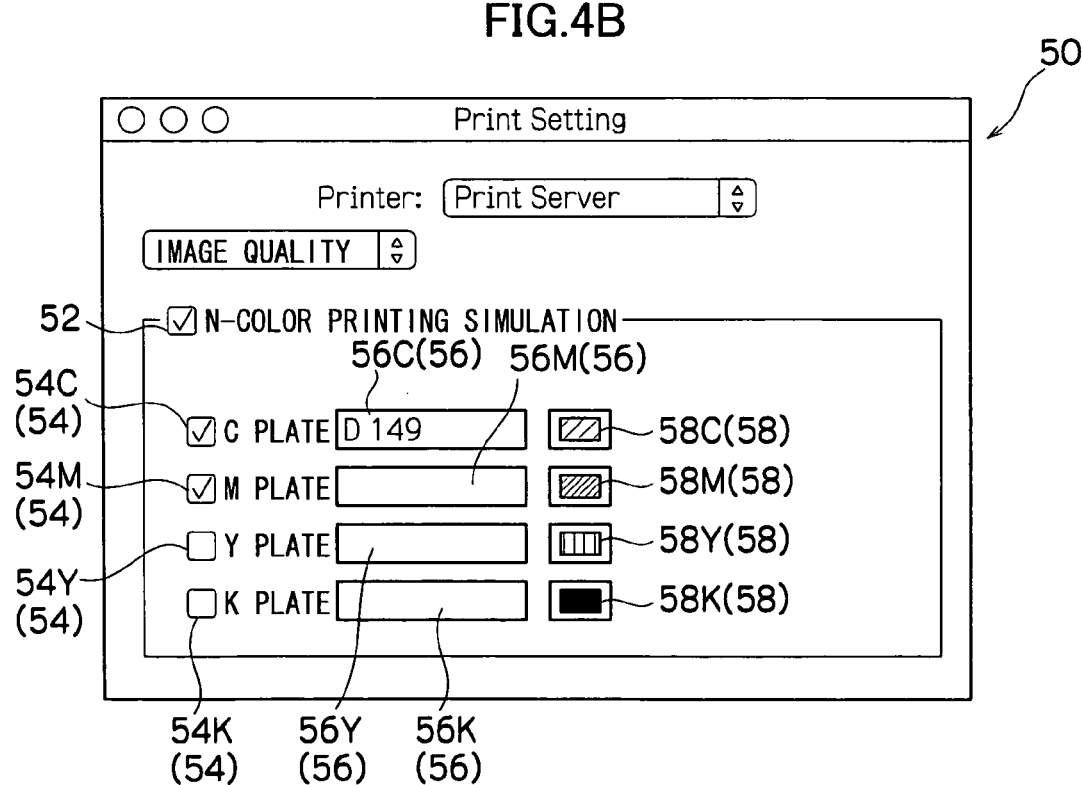
FIG. 4B is a schematic view showing the printing settings dialog which serves as an example of the user interface, and shows a display when a spot color is selected.

FIGS. 4A and 4B show the main elements of a settings dialog 50, which serves as an example of the user interface at the client terminal 14 at the time of specifying an N-color printing simulation. As shown in FIG. 4A, it is possible, at a check box 52 in the settings dialog 50, to specify whether or not an N-color printing simulation is to be performed. Further, when the check box 52 has been checked to specify that the N-color printing simulation should be performed, checking of check boxes 54C, 54M, 54Y and 54K (which are referred to collectively as check boxes 54), which are provided for the C plate, the M plate, the Y plate and the K plate, respectively, is enabled.

Here, as an example, the check boxes 54C and 54M for the C plate and the M plate are checked in the settings dialog 50, thus specifying a two-color printing simulation using the C plate and the M plate.

Input boxes 56C, 56M, 56Y and 56K (which are referred to collectively as input boxes 56) and color selection buttons 58C, 58M, 58Y and 58K (which are referred to collectively as color selection buttons 58) are also provided in the settings dialog 50 for the C plate, the M plate, the Y plate and the K plate, respectively. When a check is put in one of the check boxes 54, entry of text (text input) into the input box 56 for the corresponding color plate and operation of the corresponding color selection button 58 are enabled.

When a spot color name is entered into any of the input boxes 56 of the settings dialog 50, specification of an N-color printing simulation employing the spot color with the entered color name (spot color name) is enabled.

Further, when any of the color selection buttons 58 in the settings dialog 50 is operated, a list of spot colors stored in the database 42 of the print server 12 is displayed, and it is possible to input the color name of a spot color selected from the displayed list into the input box 56.

Selected colors are shown at the color selection buttons 58 as default values. Specifically, in a state in which no substitution colors are assigned, the color selection button 58C for the C plate, the color selection button 58M for the M plate, the color selection button 58Y for the Y plate and the color selection button 58K for the K plate show a color C, a color M, a color Y and a color K, respectively.

Thus, the client terminal 14 enables selection of a substitution color for a color plate by operation of the corresponding color selection button 58 in the settings dialog 50.

Step 102 in FIG. 3A ascertains whether or not an N-color printing simulation is to be specified, and step 104 ascertains whether spot color selection is to be performed.

Accordingly, if the check box 52 in the settings dialog 50 is checked and one or more of the check boxes 54 is checked, the determination of step 102 is positive and an N-color printing simulation is to be specified. Then, when any of the color selection buttons 58 is operated, the determination of step 104 is positive and a spot color selection is implemented.

Figure 5A:
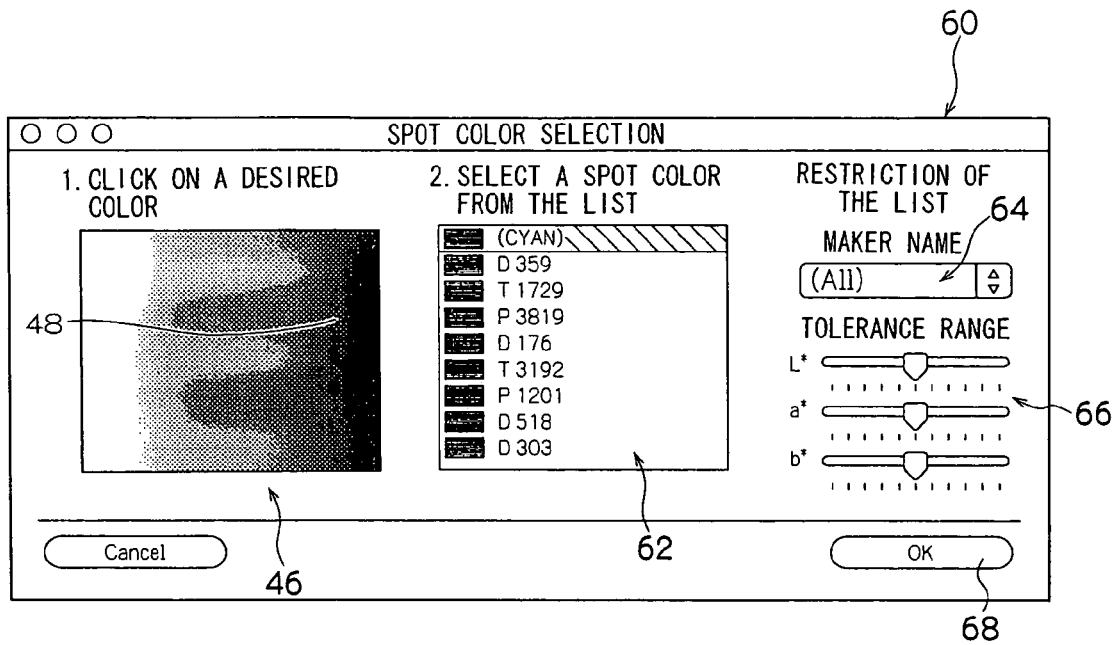
FIG. 5A is a schematic view showing a spot color selection dialog which serves as an example of the user interface, and shows a display with default values.

The spot color selection is carried out using a user interface at the client terminal 14. FIGS. 5A, 5B, 6A and 6B show a spot color selection dialog 60, which serves as an example of a user interface employed for the selection of a substitution color. As shown in FIG. 5A, the color palette 46 is displayed in this spot color selection dialog 60 and the default color is indicated by the pointer 48.

A list display area 62, an input box 64 and slide bars 66 are provided in the spot color selection dialog 60. A designation of makers of the spot colors is entered at the input box 64. The slide bars 66 are for input of tolerance ranges of L* values, a* values and b* values.

Default values of maker names and the tolerance ranges are set in the spot color selection dialog 60. When the spot color selection dialog 60 is opened, a list of spot colors based on the default values of the assigned color and the tolerance ranges is displayed in the list display area 62.

When the spot color selection dialog 60 is displayed, the printer driver 34 of the client terminal 14 sends a request for the list of spot colors based on the default values of the assigned color and the tolerance ranges.

That is, as shown in FIG. 3A, when the determination of step 104 is positive and the process advances to step 106, first, the spot color selection dialog 60 is displayed. Then, in step 108, the request for a list of spot colors is sent to the print server 12. When the list of spot colors is acquired, the process advances to step 110, and the acquired list of spot colors is displayed in the list display area of the spot color selection dialog 60.

Figure 3B:
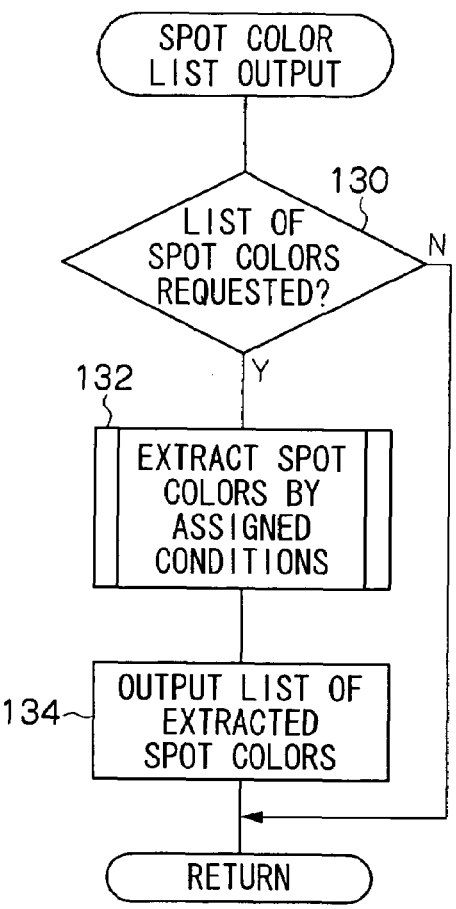
FIG. 3B is a flowchart showing an outline of spot color extraction at the print server.

FIG. 3B shows an outline of processing at the print server 12 corresponding to the spot color selection at the client terminal 14. In a first step 130 of this flowchart, it is ascertained whether or not output of a list of spot colors has been requested. When a list of spot colors is requested, the determination of step 130 is positive and the process advances to step 132.

In step 132, the spot color management section 40 extracts spot color names that meet the conditions assigned by the client terminal 14 from the database. In a subsequent step 134, the spot color management section 40 outputs a list of the extracted spot color names to the client terminal 14.

In other words, at the print server 12, the spot color management section 40 performs an extraction of spot colors on the basis of the assigned color and the specified tolerance ranges (which are all initially at the default values), and the results of extraction are outputted to the client terminal 14 to serve as the list of spot colors.

Thus, when the spot color selection dialog 60 at the client terminal 14 has been opened (step 106 in FIG. 3A), a predetermined list of spot colors is displayed in the list display area 62 of the spot color selection dialog 60.

FIG. 5A shows a display when the color selection button 58C, which corresponds to the C plate, is operated in the settings dialog 50 of FIG. 4A. Accordingly, in the spot color selection dialog 60 in FIG. 5A, "CYAN" (the C process color) and a list of names of spot colors which are close to C is shown in the list display area 62. At this time, the list entry for C, which is the assigned color, is shown highlighted.

In the flowchart of FIG. 3A, when the list of spot colors has been displayed at the list display area 62 of the spot color selection dialog 60, step 112 ascertains whether the assigned color has been changed, and step 114 ascertains whether or not a restriction has been applied, such as a change in a tolerance range or the like.

In the spot color selection dialog 60 shown in FIG. 5A, the pointer 48 is pointed to a desired color on the color palette 46. As a result, a list of spot colors for which offset amounts of L*a*b* values relative to that color (which may be a process color or a spot color) are within the tolerance ranges designated by the slide bars 66 is displayed at the list display area 62.

Thereafter, when the assigned color is changed at the client terminal 14, a list corresponding to the new assigned color is requested. That is, the determination of step 112 in FIG. 3A is positive and the process returns to step 108.

At the print server 12, spot colors are extracted on the basis of the designated color (the assigned color) and are outputted to the client terminal 14. Hence, at the client terminal 14, this list of extracted spot colors is displayed at the list display area 62 of the spot color selection dialog 60; i.e., the display is updated (step 110 of FIG. 3A).

Figure 5B:
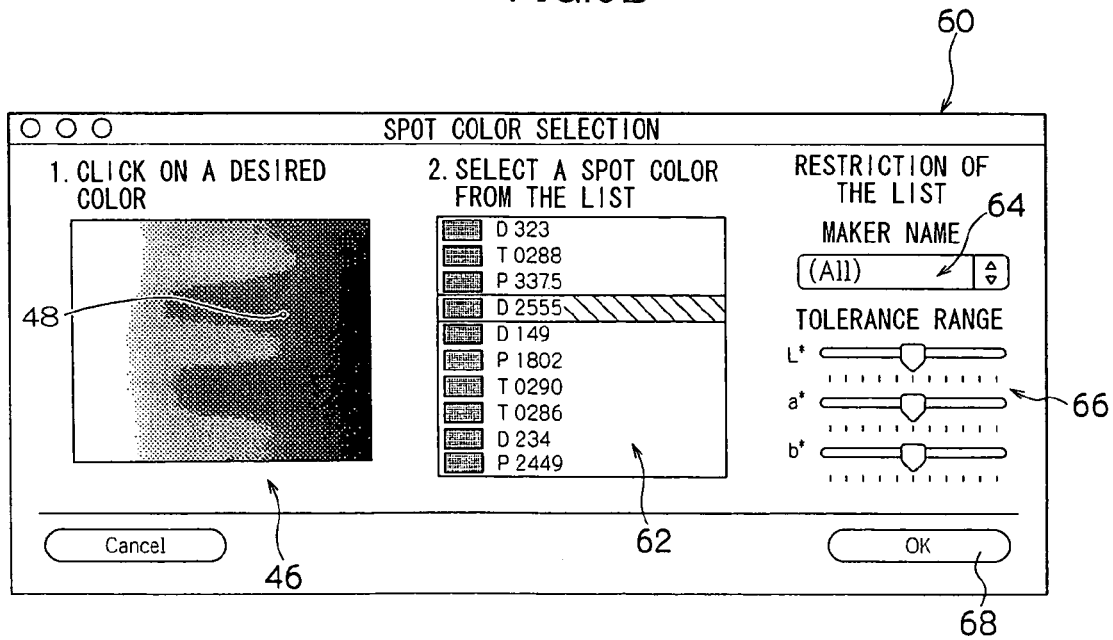
FIG. 5B is a schematic view showing the spot color selection dialog which serves as an example of the user interface, and shows a display when a designated color has been changed.

FIG. 5B shows a display example of the spot color selection dialog 60 when the assigned color has been changed at the color palette 46. A color designated by the pointer 48 or a spot color corresponding to a color which is closest thereto is shown highlighted, and similar colors within the tolerance ranges of that spot color are shown as a list.

Further, in the spot color selection dialog 60 it is possible to apply a restriction to the list displayed in the list display area 62. Such restrictions can utilize maker designations and the tolerance ranges. Herein, the default value of the maker name is "All" (all makers).

When a restriction with a manufacturing maker is to be applied, the maker name to be designated is entered at the input box 64 of the spot color selection dialog 60. An arbitrary method can be used for this maker input, such as displaying a list of maker names that are registered in the database 42 with a pull-down menu or the like and selecting from this displayed list, or the like.

When a maker name is designated in the spot color selection dialog 60, the determination of step 114 of the flowchart shown in FIG. 3A is positive. The process returns to step 108, and a list of spot colors based on the altered conditions is requested.

When a maker name is designated, the spot color management section 40 provided at the print server 12 extracts, from the spot colors that were previously extracted, spot colors from the corresponding maker(s) and outputs these spot colors to the client terminal 14.

When the client terminal 14 receives the new list of spot colors, in step 110, the spot color selection dialog 60 is displayed in accordance with the received list.

Figure 6A:
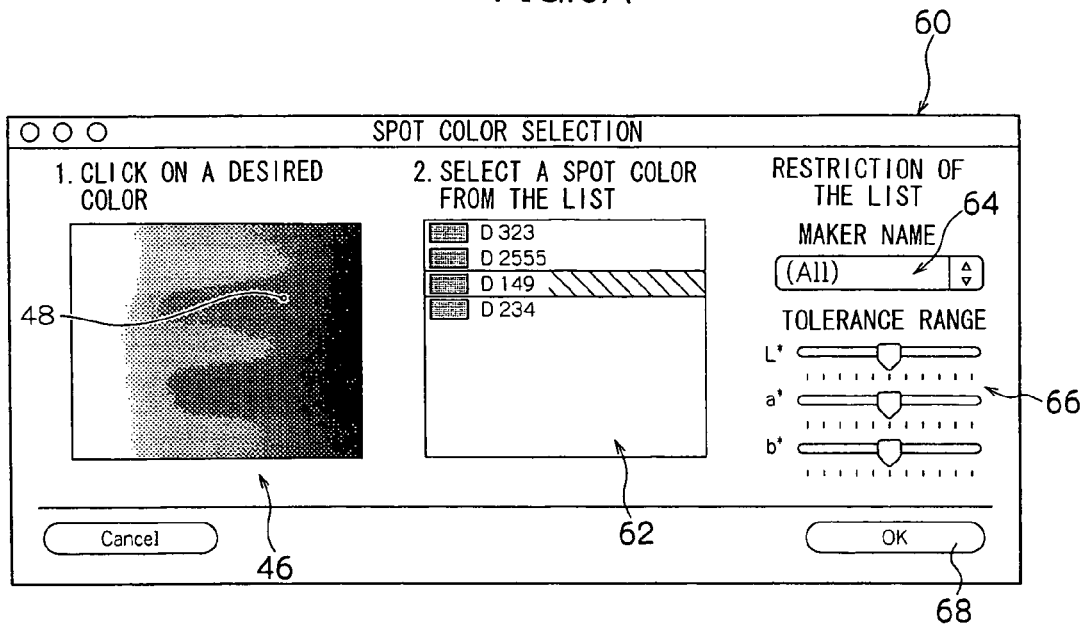
FIG. 6A is a schematic view showing the spot color selection dialog which serves as an example of the user interface.

Accordingly, the list of spot colors of the designated maker(s) is displayed at the list display area 62 of the spot color selection dialog 60, as shown in FIG. 6A. Here, it is possible that requests will be sent from the client terminal 14 only at times of broadening of the tolerance ranges of the assigned color and that, at times of narrowing of the tolerance ranges, restrictions will be applied within the client terminal 14 to the most recently acquired list.

Further, it is possible to change the tolerance ranges of the L* value, the a* value and the b* value, which serve as restriction conditions of the spot colors, from the spot color selection dialog 60. When the tolerance ranges of the L* value, a* value and b* value are to be changed, it is possible to set respective tolerance ranges for each of the L* value, the a* value and the b* value by using the slide bars 66. Herein, the tolerance ranges at such times utilize offset values (percentages or the like) of the L* value, the a* value and the b* value with respect to the assigned color.

Here, when the slide bars 66 are operated so as to narrow the tolerance ranges of any of the L* value, the a* value and the b* value, the determination of step 114 in the flowchart of FIG. 3A is positive, the process returns to step 108, and a list of spot colors that satisfy the altered tolerance conditions is requested.

When a list is provided from the print server 12 on this basis, the process advances to step 110, and the spot color selection dialog 60 is displayed in accordance with the new list.

Figure 6B:
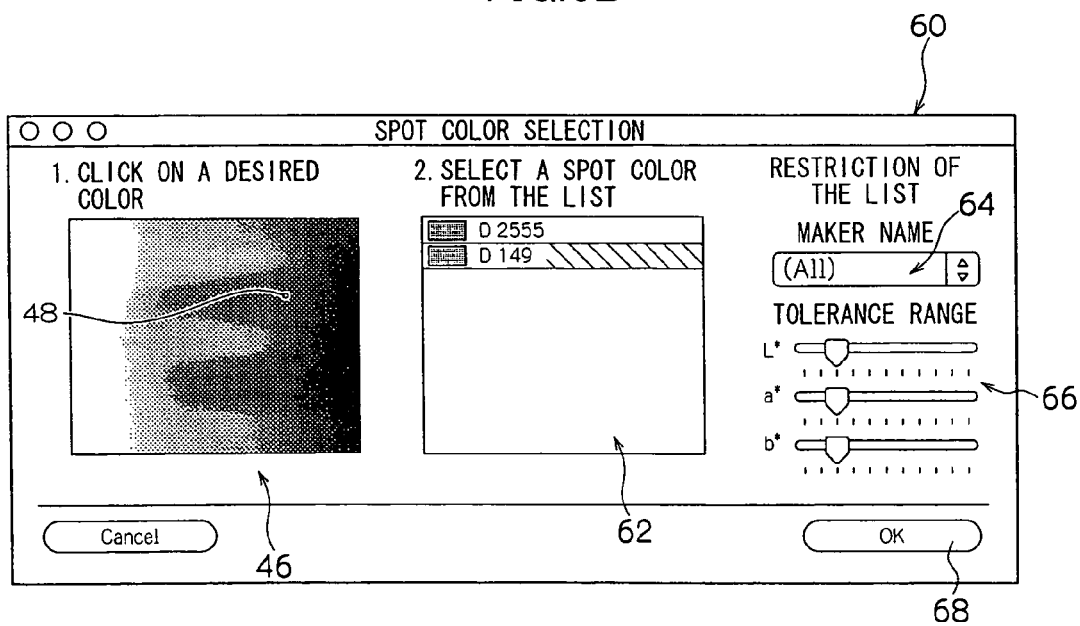
FIG. 6B is a schematic view showing the spot color selection dialog which serves as an example of the user interface, and shows a display when tolerance ranges have been changed.

FIG. 6B shows the spot color selection dialog 60 when a restriction narrowing the tolerance ranges of the L*a*b* values has been applied. It is also possible to broaden the tolerance ranges with the slide bars 66, and it is accordingly possible to increase the number of spot colors displayed in the list display area 62 and to broaden a selection range of the spot colors.

It is possible to restrict and display candidates for the desired color by applying restrictions in the spot color selection dialog 60 in this manner. Hence, when a spot color is to be set, the spot color is selected from the spot color names displayed in the list display area 62 and switched to highlighted display, after which a setting button (an OK button 68) is operated.

Thus, it is possible to set the spot color to be a substitution color when the N-color printing simulation is implemented.

In the flowchart shown in FIG. 3A, step 116 ascertains whether or not a spot color has been set. When a spot color has been set, the determination of step 116 is positive and the process advances to step 118. The spot color selection dialog 60 is closed and the spot color selection is finished. Accordingly, the client terminal 14 returns to the state in which the settings dialog 50 is displayed.

FIG. 4B shows an example of display at such a time. Specifically, in FIG. 6B, "D149" has been selected as a spot color to substitute for the C plate. When the spot color is set in accordance with this selection result, this spot color name is entered at the input box 56C in FIG. 4B and the display color of the color selection button 58C is changed to the selected spot color.

In the flowchart of FIG. 3A, when the printing settings dialog 50 has been displayed with the spot color name of the specified spot color entered therein (step 118), the process advances to step 120 and it is ascertained whether or not the printing specification has been completed. Here, if one of the color selection buttons 58 is operated to set another substitution color for a color plate, the determination of step 120 is negative, the process returns to step 102, and the processing is carried out for the next substitution color.

On the other hand, when a set button or OK button of the printing settings dialog 50 is operated, the determination of step 120 is positive and the printing specification finishes.

Thus, it is possible, at the client terminal 14, to simply and accurately input spot color names when color substitutions with spot colors and N-color printing simulations are to be implemented.

Furthermore, at the client terminal 14, it is possible to check assigned colors on the color palette 46 while selecting spot colors. At such times, because similar colors are displayed together, it is possible to select spot colors for desired colors accurately.

The present invention is not limited to the present embodiment as described above. For example, although an example has been described for the present embodiment in which the spot color selection dialog 60 serves as the user interface when a spot color is being selected, user interfaces with arbitrary structures may be employed.

Figure 7:
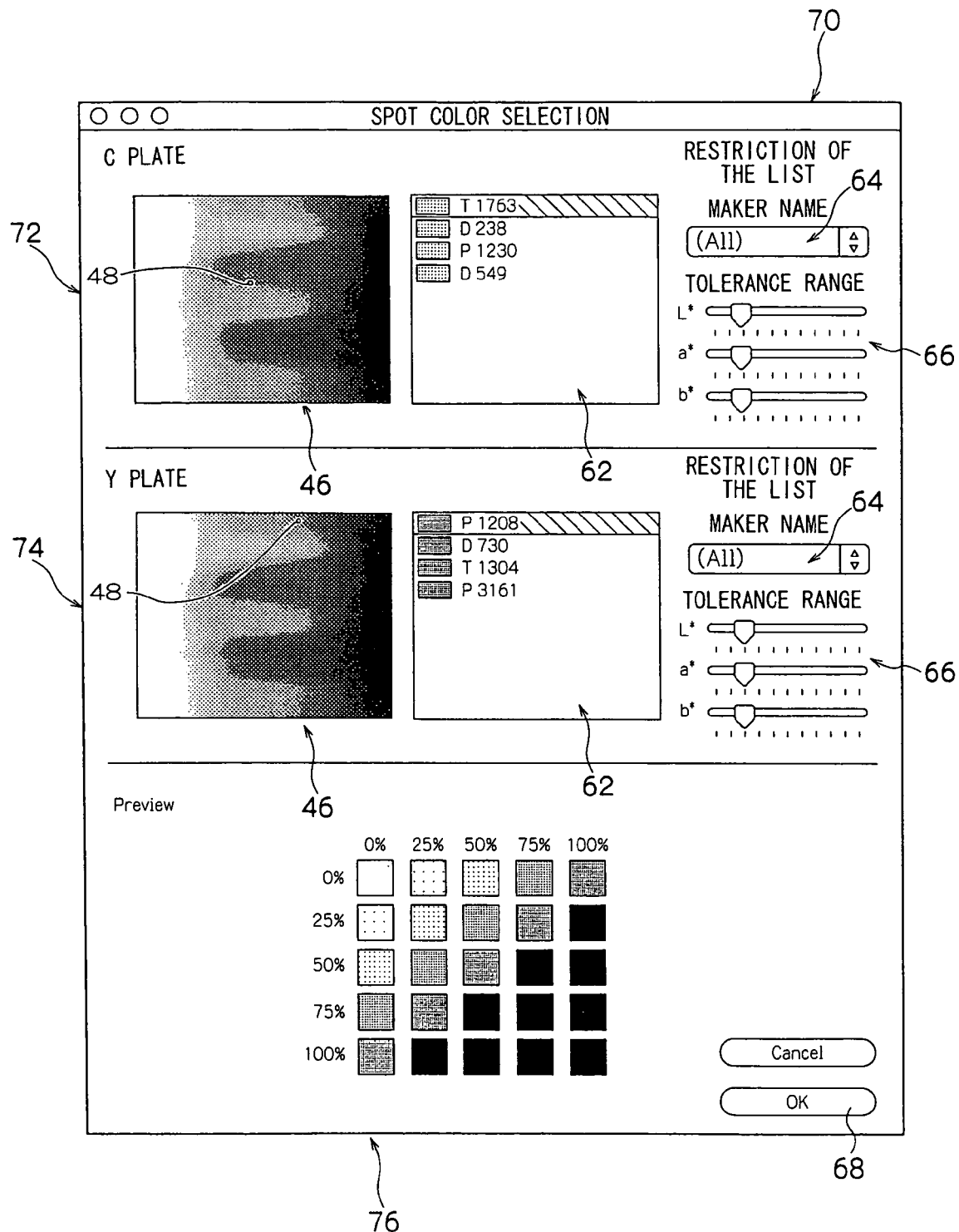
FIG. 7 is a schematic view of a spot color selection dialog illustrating another example of the user interface.

For example, the user interface may have a form such that selection of spot colors for each of a plurality of color plates is possible. As an example thereof, FIG. 7 shows a spot color selection dialog 70, which is an example of a user interface which enables selection of spot colors for two of the color plates.

For example, if a two-color printing simulation using the C plate and the M plate or the like is to be specified, the spot color selection dialog 70 can be employed when carrying out a selection of spot colors as substitution colors. A spot color selection section 72 for the C plate and a spot color selection section 74 for the M plate are displayed in the spot color selection dialog 70 at the same time.

A preview display section 76 is also provided in the spot color selection dialog 70. This preview display section 76 displays color patches of cases in which densities of a spot color for the C plate and a spot color for the M plate are respectively varied and mixed.

When the spot color selection dialog 70 with this form is employed, it is possible to verify hues of the finished article if the two-color printing simulation is to be implemented with the spot colors. Thus, more accurate selection of a combination of a spot color with a spot color is enabled.

In the spot color selection dialog 70 with this form, the color patches of the preview display section 76 may be shown using an image selected by the user beforehand. Alternatively, a preview image of the image for which printing processing is to be executed may be displayed instead of the color patches.

In the present embodiment as described above, the tolerance ranges are used as restriction conditions for the list of spot colors. However, ranges of ratios of offsets of the L*a*b* values, ranges of offset amounts or ratios of other characteristic values of color, such as RGB or CMYK values or the like, or the like may be used.

It is also possible to include ink prices, delivery times, availability of stock and so forth in the database 42 for each spot color, and hence to use these kinds of information as restriction conditions. Furthermore, it is possible to prepare a database in which each spot color is categorized in accordance with an impression of the color, with natural language such as "relaxing", "summery" and suchlike, or the like, and accordingly to display lists using these categories as keywords.

In the present embodiment, the color palette 46 is used to assign a color as a reference point. However, the present invention is not limited thus and arbitrary structures may be employed: a reference point color may be assigned using a list of typical colors which has been prepared in advance; colors may be inputted using a scanner, a color measurement instrument or the like; characteristic values of colors, such as L*a*b* values and the like, may be inputted as numerical values; and so forth.

In the present embodiment, use of the color palette 46, whose horizontal axis represents brightness (the L* value) and whose vertical axis represents color (meaning hue and chroma), has been described. However, if L*a*b* values are to be used as the characteristic values, a color palette with an arbitrary structure may be employed as long as it features display colors and information corresponding to L*a*b* values.

It is further possible to employ, as the color palette, an arbitrary structure in which typical colors are displayed, a selection is made from the displayed typical colors, and hence the selected color and colors similar to the selected color are displayed, or suchlike.

For the present embodiment, the spot color list displayed at the list display area 62 is changed automatically when the color palette 46 of the spot color selection dialog 60 is clicked on. However, instead of this, it could be that when some spot color displayed in the list display area 62 is assigned (clicked on), that color's name is shown highlighted, automatic movement of the pointer 48 on the color palette 46 in accordance with the L*a*b* values of that spot color is implemented, the selected spot color is displayed on the color palette 46, and an update of the spot color list displayed at the list display area 62 is performed with that color as the assigned color.

For the present embodiment, L*a*b* values have been used as the characteristic values. However, the present invention is not limited thus. As long as the values represent characteristics of the colors, it is possible to employ CMYK values, XYZ values, RGB values or the like. In such cases, as well as a density value of 100%, pluralities of values in which density is varied in steps of 5%, 25% or the like may be included.

In the present embodiment, the database of spot colors is kept at the print server 12. However, the database may be kept at any of the client terminals 14, or may be kept at a Web server to which connection over the Internet or the like is possible, at a maker of the print server 12, a manufacturing maker of the spot colors or the like. If there is a plurality of print servers in the network, the database may be kept at a dedicated print server, and it may be possible to perform spot color printing using an arbitrary print server.

Note that the present embodiment as described above illustrates an example of the present invention, and does not limit structures of the present invention. For example, in the present embodiment, the print server 12 has been described as an example. However, the present invention is not limited by the print server 12. An image processing device with an arbitrary structure which is capable of image processing in accordance with image data and drawing commands prepared at the client terminals 14 may be employed.

Furthermore, an example of selection of spot colors for when carrying out printing processing has been described for the present embodiment. However, the present invention is not limited thus, and can be utilized for selection of various colored materials and the like, such as: coating materials such as paint, art paints and the like; color pens; color pencils; fibers; paper (origami paper, colored paper, etc.); fabrics; films; and so forth.

As has been described above, the present invention is a printing specification method for specifying a spot color, which differs from process colors, as a substitution color when setting the substitution color for a color plate of one of the process colors and performing printing processing, which method includes: on the basis of characteristic values which set a reference point and of tolerance ranges of these characteristic values, extracting corresponding spot colors from a database of spot colors, the database being based on color information including characteristic values, which specify the spot colors, and spot color names; displaying a list of names of the extracted spot colors; and specifying a spot color corresponding to a name selected from the list as the substitution color.

In the present invention, it is possible to select the characteristic values to set the reference point by selecting the position of a color in a color palette as the reference point.

According to this invention, when a color palette is employed, visual selection of spot colors is enabled. When, for example, L*a*b* values are used as the characteristic values, a palette that features information corresponding to selection positions and L*a*b* values can be employed as this color palette.

When a color palette is being used, it is possible to set a position of assignment on the color palette to a position based on the characteristic values of a selected spot color by selecting that spot color from the list.

If the characteristic values are displayed as numerical values such as L*a*b* values or the like, setting of the characteristic values for the reference point may be done by entering numerical values. Further, characteristic values which have been detected or measured with a scanner, a color measurement instrument or the like may be utilized. In such a case, this is made possible by setting an input component for inputting the characteristic values beforehand. Further again, the characteristic values are not limited to L*a*b* values: CMYK values, XYZ values, RGB values and the like may be employed. In such a case, rather than only a density value of 100%, values in which density is varied in steps of 5%, 25% or the like may be included.

Accordingly, it is possible to re-set the characteristic values for the reference point simply and accurately from the displayed list of spot colors. Here, when the reference point values have been re-set, the spot colors may be extracted from the database again, on the basis of these reference point values, and displayed in the list.

In the present invention as described above, it is preferable if the tolerance ranges relative to the characteristic values that set the reference point can be altered. Hence, broadening of the tolerance ranges is simple, and it is possible to simply and accurately reduce and increase the number of spot color names displayed in the list.

Furthermore, in the present invention, it is preferable to assign color information and perform the extraction of spot colors on the basis of the tolerance ranges and the assigned color information.

Hence, if, for example, the names and suchlike of the makers who manufacture the spot color inks are included in the color information, it is possible to display spot colors in lists separated by maker.

What is claimed is:

1. A printing specification method that specifies a spot color, which differs from process colors, as a substitution color when setting the substitution color for a color plate of at least one of the process colors and performing printing processing, the method comprising:
   on the basis of a characteristic value which sets a reference point and of a tolerance range of this characteristic value, extracting corresponding spot colors from a database of spot colors, the database being based on color information including characteristic values, which specify the spot colors, and spot color names;
   displaying a list of names of the extracted spot colors; and
   specifying a spot color corresponding to a name selected from the list as the substitution color.

2. The printing specification method of claim 1, wherein, by selecting a position in a color palette, a characteristic value which corresponds to a color at the position is selected as the characteristic value which sets the reference point.

3. The printing specification method of claim 2, wherein, by selecting the name of a spot color from the list, an assigned position in the color palette is set to a position corresponding to color information of the spot color whose name has been selected.

4. The printing specification method of claim 1, wherein the tolerance range of the characteristic value which sets the reference point is alterable.

5. The printing specification method of claim 1, wherein color information is designated and spot colors are extracted on the basis of the tolerance range and the designated color information.

6. A printing specification device that specifies a spot color, which differs from process colors, as a substitution color when setting the substitution color for a color plate of at least one of the process colors and performing printing processing, the device comprising:
   an spot color extraction component which, on the basis of a characteristic value which sets a reference point and of a tolerance range of this characteristic value, extracts corresponding spot colors from a database of spot colors, the database being based on color information including characteristic values, which specify the spot colors, and spot color names;
   a display which displays a list of names of the extracted spot colors; and
   a spot color specification component which specifies a spot color corresponding to a name selected from the list as the substitution color.

7. The printing specification device of claim 6, wherein, by selecting a position in a color palette, a characteristic value which corresponds to a color at the position is selected as the characteristic value which sets the reference point.

8. The printing specification device of claim 7, wherein, by selecting the name of a spot color from the list, an assigned position in the color palette is set to a position corresponding to color information of the spot color whose name has been selected.

9. The printing specification device of claim 6, wherein the tolerance range of the characteristic value which sets the reference point is alterable.

10. The printing specification device of claim 6, wherein color information is designated and spot colors are extracted on the basis of the tolerance range and the designated color information.

* * * * *